U. S. JAMES.
SHOCK ABSORBING VEHICLE TIRE.
APPLICATION FILED SEPT. 4, 1917. RENEWED NOV. 5, 1919.
1,327,478.
Patented Jan. 6, 1920.
3 SHEETS—SHEET 1.
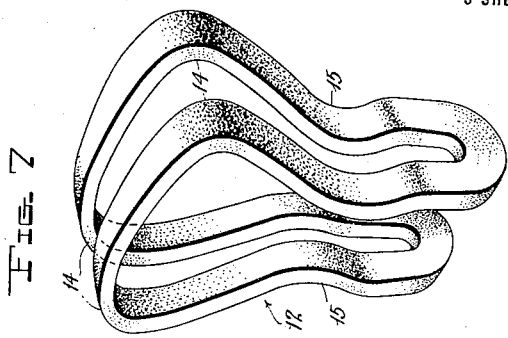
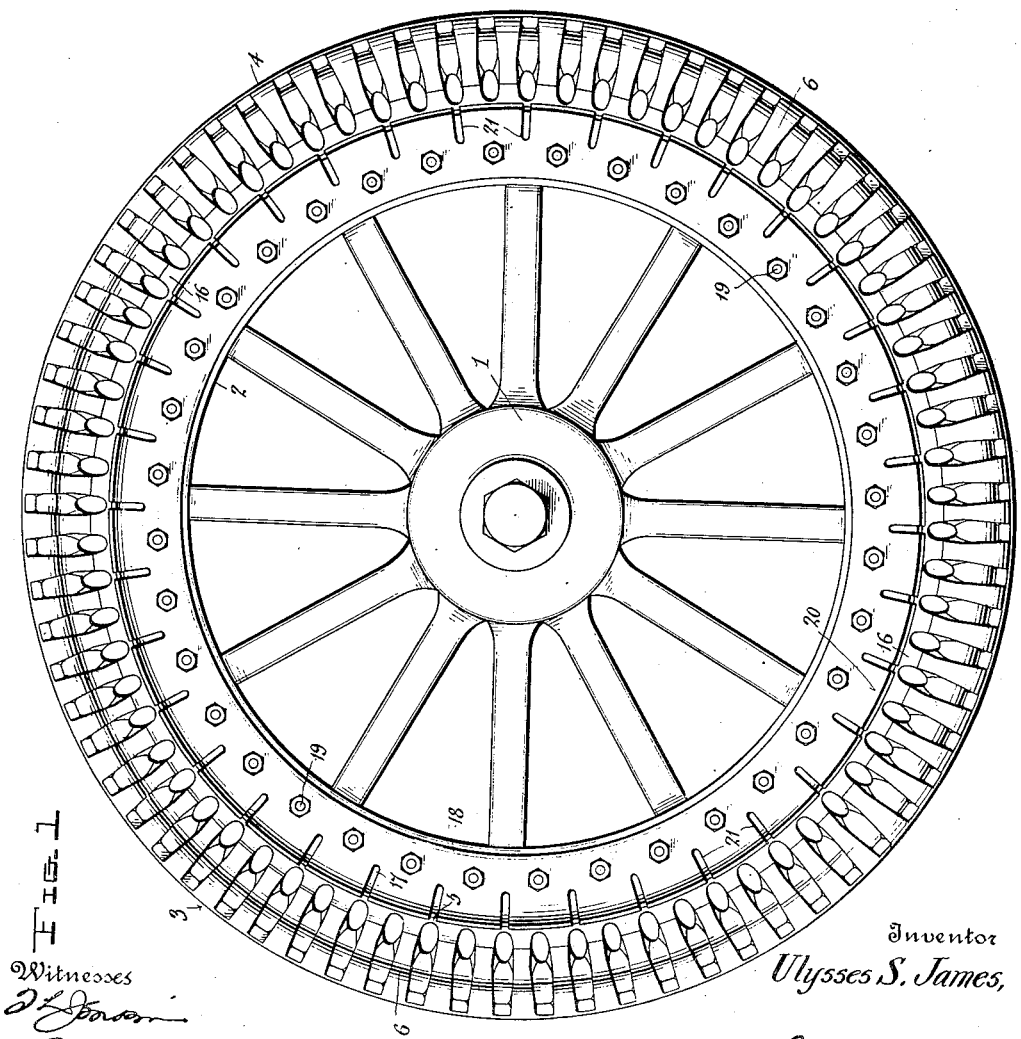
Witnesses
Inventor
Ulysses S. James,
By
Attorney U. S. JAMES.
SHOCK ABSORBING VEHICLE TIRE.
APPLICATION FILED SEPT. 4, 1917. RENEWED NOV. 5, 1919.
1,327,478.
Patented Jan. 6, 1920.
3 SHEETS—SHEET 2.
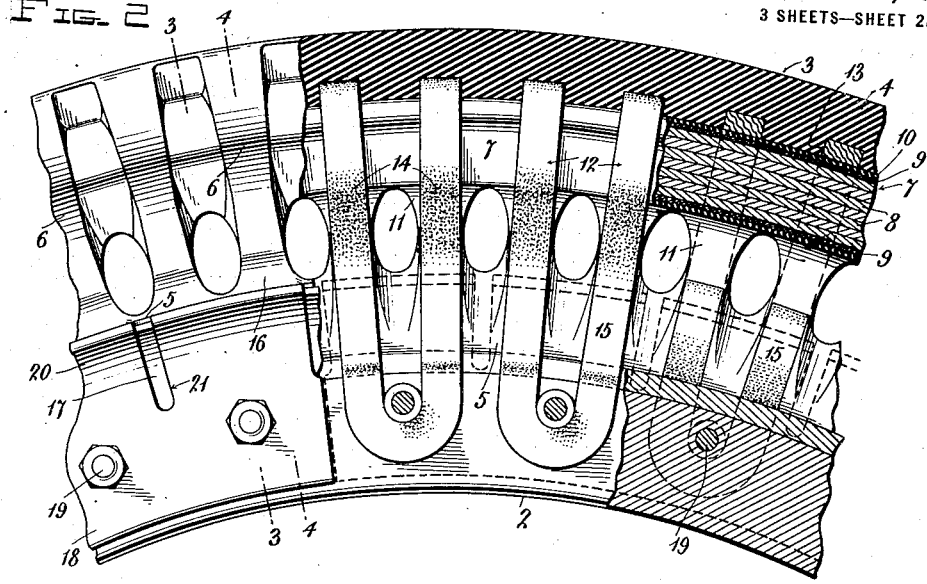
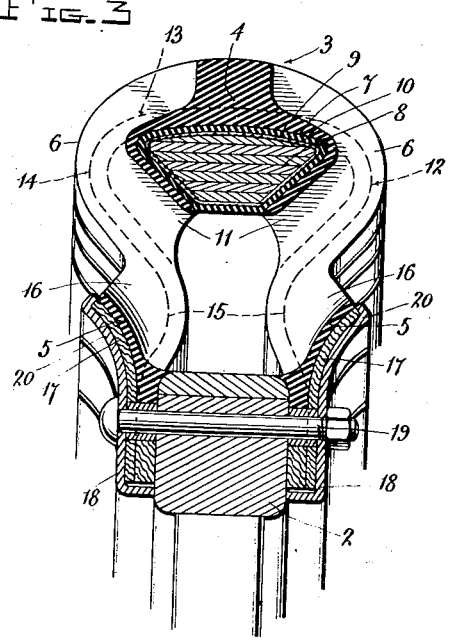
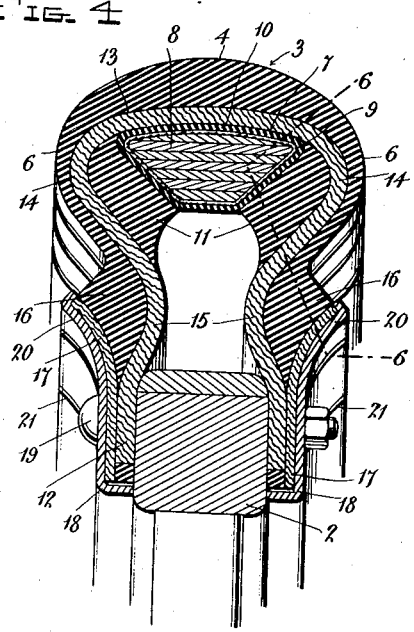
Inventor
Ulysses S. James,
Witnesses
By
Attorney

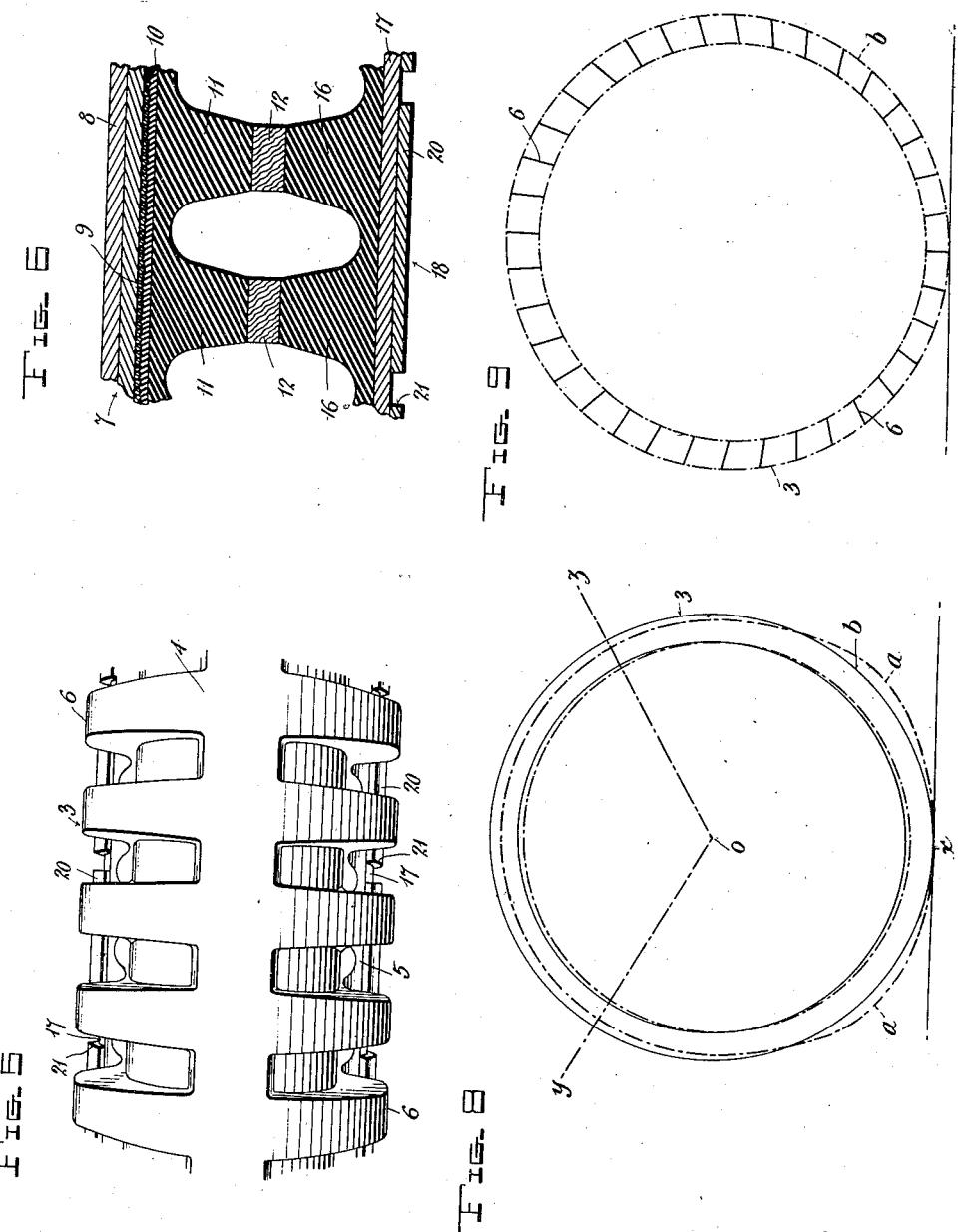

UNITED STATES PATENT OFFICE.

ULYSSES S. JAMES, OF NEWARK, NEW JERSEY.

SHOCK-ABSORBING VEHICLE-TIRE.

1,327,478. Specification of Letters Patent. Patented Jan. 6, 1920.

Application filed September 4, 1917, Serial No. 189,637. Renewed November 5, 1919. Serial No. 335,946.

*To all whom it may concern:*

Be it known that I, ULYSSES S. JAMES, a citizen of the United States, residing at Newark, in the county of Essex and State of New Jersey, have invented new and useful Improvements in Shock-Absorbing Vehicle-Tires, of which the following is a specification.

The present invention relates to improvements in resilient or shock-absorbing tires for vehicles, and more especially to those of the class adapted for use on automobiles, motor trucks, and the like. The primary objects of the invention are to provide an improved tire which will be capable of efficiently absorbing shocks and vibrations, due to unevenness or irregularities in the surface of the street or road during the travel of the vehicle thereover; to provide a durable tire of this character; to provide a tire which will afford good traction and will possess non-skid properties; to provide a tire wherein friction between the component shock-absorbing elements is reduced to a minimum, thus offering a minimum amount of resistance in operation; and to provide a tire of this class which can be readily adjusted for the different loads to be carried and the degree of resiliency desired.

To these and other ends, the invention consists in certain improvements, and combinations and arrangements of parts, all as will be hereinafter more fully described, the novel features being pointed out particularly in the claims at the end of the specification.

In the accompanying drawings:

Figure 1 is a side elevation of a vehicle wheel equipped with a shock-absorbing or resilient tire constructed in accordance with the present invention.

Fig. 2 represents, on an enlarged scale, a portion of the tire and the wheel felly, this view being partly in section to show the various components of the tire.

Fig. 3 represents a transverse section through the tire and the wheel felly on the line 3—3 of Fig. 2.

Fig. 4 represents a transverse section through the tire on the line 4—4 of Fig. 2.

Fig. 5 shows the appearance of the tire as viewed from its tread or periphery.

Fig. 6 represents a section on the line 6—6 of Fig. 4.

Fig. 7 is a detail perspective view of one of the load-sustaining slings; and

Figs. 8 and 9 are diagrammatic views showing the mode of operation of the components of the tire under a load imposed thereon.

Similar parts are designated by the same reference characters in the several views.

Vehicle tires constructed in accordance with the present invention are applicable generally to vehicles of various kinds wherein it is desirable or necessary to absorb shocks or vibrations incident to the travel of such vehicles over pavements and roads, although the invention is particularly applicable to tires for use upon automobiles, motor trucks, and other self-propelled vehicles wherein the shocks or vibrations occur at close intervals, due to the relatively high speeds at which such vehicles travel, and, furthermore, the present invention provides a tire which will afford good traction upon soft road surfaces and it possesses non-skid properties. The preferred embodiment of the invention is shown in the accompanying drawings and will be hereinafter described in detail, but it is to be understood that the invention is not restricted to the precise construction and arrangement shown, as equivalent constructions and arrangements are contemplated and will be included within the scope of the claims.

In the present instance, 1 designates a wheel such as commonly used upon automobiles or motor vehicles, the wheel having a felly 2 which may be of the usual construction. The tire is mounted upon the felly and it comprises a tread element 3 composed preferably of relatively soft or spongy rubber, this tread element presenting a circumferentially continuous tread surface 4, continuous lateral margins 5, and intervening radially extending ribs 6. The tire also comprises a stress or load-distributing ring 7 which has in effect a floating action relatively to the wheel. This ring is endless and of a diameter greater than the wheel felly and it is preferably of a laminated construction, the ring, as shown, being composed of laminations 8 of wood bent to the proper curvature and united by waterproof glue or other adhesive. This laminated stress-sustaining and distributing ring as thus constructed is flexible and it is bound by a covering of cord 9 which is wound closely around it, a covering of rubber 10 being applied over the winding or wrapping of cord, and this covering of rubber is vulcanized to the cord. The tread element 3 of the tire is vulcanized to the outer periphery of the stress-distributing ring 7, and rib-like cushions 11 of relatively soft rubber are vulcanized to the sides of the stress-sustaining ring, these cushions 11 lying preferably in the same planes with the ribs 6 which extend inwardly from the tread element. Stresses between the wheel and the tire are transmitted between these parts by a number of slings 12 which connect the wheel felly and the stress-distributing ring. These slings are composed, preferably, of a suitable number of layers of fabric which renders them flexible and imparts the necessary tensile strength thereto, and each sling is in the form of a loop or endless band, the two ends of the loop or band being arranged to lie against the opposite sides of the wheel felly and the intermediate portions of the loops or bands extending across and lying against the outer periphery of the stress-distributing ring. The slings preferably lie between the cushions 11 and the ribs 6 and are contained in recesses 13 of the tire, these recesses being preferably located in the planes of the ribs 6 and the cushions 11. The slings are preferably bowed outwardly, as at 14, at the opposite sides of the stress-distributing ring 7 and are bowed inwardly, as at 15, between the stress-sustaining ring and the wheel felly. The inner portions of the ribs 6 adjacent to the continuous margins 5 thereof are thickened to form cushions 16, these cushions lying at the outer sides of the sling and presenting curved surfaces to the slings to form the bends 15 therein. A continuous strip of fabric or other relatively strong, inextensible material 17 is vulcanized to the outer side of each of the continuous margins 5 and also to the ends of the loops which lie against the sides of the wheel felly, and continuous metal or other rigid flanges 18 are provided at the outer sides of these strips 17. The tire is secured to the wheel felly by a suitable number of bolts 19, the number of bolts corresponding to the number of slings employed, these bolts extending transversely through the felly and through the bends in the extremities of the slings as well as through the strips 17. When the bolts 19 are tightened, the flanges 18 are caused to clamp the fabric strips 17, the margins 5, and the looped ends of the slings firmly against opposite sides of the felly, the fabric strips preventing or minimizing wear between the clamping flanges and the lateral margins of the tire. The outer portions 20 of the clamping flanges are curved outwardly, to more or less extent, and they bear inwardly against the cushions 16 of the tire, thereby forming the inward bends 15 in the slings. By varying the extent of curvature of these portions of the clamping flanges, the tension on the slings may be varied and, in consequence, the degree of resiliency and the load-sustaining capacity of the tire may be varied as desired. For example, where these portions 20 of the clamping flanges have a greater curvature than that shown, the slings will be bent inwardly to a less degree and, hence, the slings will be under a less tension. Conversely, diminished outward curvature of the portions 20 of the clamping flanges will cause the slings to be bent inwardly to an increased degree at the point 15 and the tension on the slings will be correspondingly increased. The cushions 16 of relatively soft rubber which are interposed between the clamping flanges and the bends 15 of the slings will become compressed or expanded as the tension upon the slings increases and diminishes and, also, the cushions 11 will become compressed or will expand as the tension on the slings increases and diminishes respectively, thus imparting the necessary degree of resiliency to the tire. Preferably, and as shown, the clamping flanges are continuous near their inner circumference while the outer portion 20 thereof is slotted at intervals, as at 21, to enable the portions 20 of the clamping flanges to expand or contract as the outward pressure on the cushions 16 increases and diminishes respectively, thereby imparting additional resilience to the tire.

In constructing the tire, the tread 3 with its ribs 6 and marginal portions 5 may be cast integrally with the cushions 11, the slings 12 being in that case cast in place, or the tread, ribs and marginal portions may be made in one piece and the cushions 11 made separately therefrom, in which case the fabric slings would be placed between these elements and vulcanized thereto. In both instances, however, the rubber components of the tire will be firmly united to one another and to the slings and the stress-distributing ring and, hence, friction between the components of the tire is eliminated and, in consequence, wear is avoided and loss of power in the form of friction is reduced to a minimum.

In the operation of the tire when in use upon a vehicle, the flexible stress-distributing ring, which is endless and of unvarying circumferential length, is embedded within and united to the tire throughout its circumference, and it therefore has the function of receiving the stress imposed upon the tire at one point in its periphery and distributing such stress upon a considerable portion of the remainder of the tire. The slings which radially connect the stress-distributing ring to the wheel felly not only anchor the tire upon the wheel, but they also perform the function of resiliently connecting the stress-distributing ring to the felly, although the slings are composed of relatively inextensible, tough and durable material, such as multiple-ply fabric, this resilient property of the slings being imparted thereto by the bends in the slings and the elastic cushions of rubber which maintain such bends but yield or become compressed to an extent proportionate to the tension exerted on the slings. If it is assumed that the tire is free from load or weight at all points in its circumference, then the stress-distributing ring will be concentric with the center of the wheel and the tension on all the slings will be uniform, or substantially so. However, in actual service, the various portions of the periphery of the tire are presented successively to the ground and, hence, receive the load or weight tending to force the stress-distributing ring relatively inwardly or toward the center of the wheel. Inasmuch as the stress-distributing ring is of constant or unvarying circumferential length, though flexible, it assumes a somewhat elliptical form, upon application of pressure at the point $x$. The slings, however, prevent excess deformation of the stress-distributing ring, as indicated by the dotted line $a$ (Fig. 8), they serving to maintain such ring in a slightly elliptical form, as indicated by the line $b$ (Fig. 8), upon application of pressure at the point $x$, and the ring under such conditions will be eccentric to the center $o$ of the wheel. Under these conditions, the slings at opposite sides of the point $x$ where the pressure is applied will prevent bulging of the ring at the points $a$, and the consequent maintenance of the ring in circular form transfers the stress applied to the ring to that portion of the ring opposite to the point $x$, said portion of the ring having a force applied to it which force tends to move it outwardly or away from the wheel felly, and such outward force is sustained by the slings at the side of the wheel. In practice, the weight upon the wheel will be sustained principally upon that portion of the tire included by the angle $y$, $o$, $z$ through the tension imposed upon the slings included by this angle and, owing to the resiliency of tension provided for the slings, the wheel will be suspended resiliently within the tire, and the stress will be distributed throughout the circumferential extent of the tire by the ring. The slings at opposite sides of the vertical center of the wheel will assume angular positions at relatively reverse inclinations to the radii of the wheel, and these slings will transmit torque between the wheel and tire, particularly when the tire is used upon a driving wheel of a motor vehicle.

Tires constructed substantially as herein described will possess non-skid properties to a considerable degree and they will also afford good traction which is of importance when the tires are used upon the driving wheels of motor vehicles, these properties being obtained by virtue of the rib-like form presented by the tire.

I claim as my invention:—

1. A tire comprising a rubber body, an endless flexible ring member embedded in said body, and radially extensible slings for connecting the ring to a felly at a plurality of points in the periphery thereof.

2. A tire comprising a body, a flexible circumferentially inextensible ring combined therewith, and a plurality of circumferentially spaced slings for connecting said ring to a wheel felly.

3. A vehicle tire comprising a body, an endless circumferentially inextensible member embedded in the body, and a plurality of radially extensible slings looped over said member for connecting the latter to a wheel felly at circumferentially spaced intervals.

4. A vehicle tire comprising a body, a stress-distributing ring embedded in the body, and a plurality of radially extensible slings having their intermediate portions looped over said ring, the ends of said slings being connectible to a wheel felly at circumferential spaced intervals.

5. A vehicle tire comprising a body, an endless stress-distributing element associated with the body, flexible tension members for connecting said element at circumferentially spaced intervals to a wheel felly, and means acting laterally upon said members to flex and tension them.

6. A vehicle tire comprising a body, an endless stress-distributing member embedded in the body, flexible slings for connecting said member at circumferentially spaced intervals to a wheel felly, and means acting to flex and tension the said sling.

7. A vehicle tire comprising a body, an annular stress-distributing member of constant circumferential extent combined with the body, radial laterally flexible slings for connecting said member to a wheel felly, and resilient means acting to laterally flex and tension the slings.

8. A vehicle tire comprising an endless stress-distributing member, a plurality of laterally flexible slings for connecting said member at circumferentially spaced intervals to a wheel felly, and yieldable cushions associated with the slings and operating to impart radial resilience to the slings.

9. A vehicle tire comprising an annular stress-distributing member, a plurality of radial slings of flexible substantially inextensible material for connecting said member to a wheel felly, and yieldable cushions acting to flex the slings laterally and thereby govern the tension thereof.

10. A vehicle tire comprising an annular stress-distributing member, radial laterally flexible tension devices for connecting said member to a wheel felly, yielding means active to laterally flex and thereby tension said devices, and means for varying the flexing action of said yielding means.

11. A vehicle tire comprising an annular stress-distributing member, a plurality of slings looped over the outer periphery of said member and having their ends adapted for connection to a wheel felly, and resilient means acting to laterally flex and thereby tension said slings.

12. A vehicle tire comprising an annular stress-distributing member adapted to be spaced outwardly from the wheel felly, and means for connecting said member at circumferentially spaced intervals to the wheel felly embodying a plurality of slings each composed of a closed loop of flexible substantially inextensible material, the bends in the ends thereof being adapted for attachment to opposite sides of the wheel felly and the intermediate portions being slung over the outer periphery of said member.

13. A vehicle tire comprising a rubber body, a stress-distributing ring embedded therein and composed of laminations of flexible material united to one another, and means for connecting said ring at intervals in its circumference to a wheel felly.

14. A vehicle tire comprising a rubber body, a stress-distributing ring embedded therein and composed of laminations of flexible material and a binding wrapped thereon, and means for connecting said ring at intervals in its circumference to a wheel felly.

15. A tire for vehicle wheels comprising a body of rubber, a stress-distributing member embedded in and encircling the body, and a plurality of radial slings embedded in the body and looped over the outer periphery of said member, the ends of said slings being adapted for attachment to the wheel felly, and the body of the tire having resilient cushions acting to laterally flex and thereby tension the slings.

16. A tire for vehicle wheels comprising a body of rubber forming a tread and ribs extending from said tread inwardly toward the inner circumference of the tire, an annular stress-distributing ring embedded in the body within the tread thereof, slings looped over the outer periphery of said ring and having ends adapted for attachment to opposite sides of the wheel felly, said slings lying in the planes of said ribs, resilient cushions formed on the inner ends of said ribs, and means for compressing said cushions to cause lateral flexing and consequent tensioning of the slings.

17. A tire for vehicle wheels comprising a body of rubber having a tread and radial exteriorly exposed ribs extending inwardly therefrom, a stress-distributing ring embedded in the body, radial slings embedded in said ribs and slung over the outer periphery of said ring, the ends of the slings being adapted for attachment to the wheel felly, and resilient cushions acting on the slings to form lateral bends therein.

18. A tire for vehicle wheels comprising a stress-distributing member, slings of flexible substantially inextensible material looped over said member and having ends adapted to be attached to opposite sides of the wheel felly, resilient cushions arranged to bear against and to laterally flex the slings, and means to compress said cushions to varying degrees and thereby adjust the tension of said slings.

19. A tire for vehicle wheels comprising a rubber body having radial ribs extending inwardly from the tread thereof, the inner ends of said ribs at each side of the body being united by a continuous margin, an annular stress-distributing member embedded in the body, a plurality of radial flexible slings looped over the outer periphery of said member and having ends lying within the respective continuous margins of the body, resilient cushions acting to flex and thereby tension said slings, and clamping flanges at opposite sides of the wheel felly operative to secure the slings and said margins of the body to the felly and to hold said cushions in coöperative relation with the slings.

20. A vehicle tire comprising a rubber body having radial ribs extending inwardly from the outer circumference thereof and continuous margins uniting the inner ends of the ribs at opposite sides of the body, an annular stress-distributing member embedded in the body, slings composed of fabric embedded in the ribs of the body and looped over the outer periphery of said member, the ribs having cushions operative laterally upon the respective slings to flex and thereby tension them, a binding strip united to the continuous margin of the ribs and the inner ends of the slings at each side of the tire, and clamping flanges for clamping the binding strips and the ends of the slings against the opposite sides of the wheel felly.

In testimony whereof I have hereunto set my hand in presence of two subscribing witnesses.

ULYSSES S. JAMES.

Witnesses:
HARRY FOSTER,
ERNEST TRAUTMAN.